United States Patent
Das et al.

(10) Patent No.: US 7,996,387 B2
(45) Date of Patent: Aug. 9, 2011

(54) TECHNIQUES FOR EXTENDING USER-DEFINED INDEXES WITH AUXILIARY PROPERTIES

(75) Inventors: Dinesh Das, Redwood City, CA (US); Wesley Lin, West Covina, CA (US); Seema Sundara, Nashua, NH (US); Ying Hu, Nashua, NH (US); Sriram Krishnamurthy, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 617 days.

(21) Appl. No.: 12/027,897

(22) Filed: Feb. 7, 2008

(65) Prior Publication Data

US 2009/0030883 A1    Jan. 29, 2009

Related U.S. Application Data

(60) Provisional application No. 60/952,455, filed on Jul. 27, 2007.

(51) Int. Cl.
*G06F 17/30* (2006.01)

(52) U.S. Cl. .......................... 707/715; 707/718

(58) Field of Classification Search .................. 707/715, 707/718
See application file for complete search history.

(56) References Cited

U.S. PATENT DOCUMENTS

| | | |
|---|---|---|
| 5,893,104 A | 4/1999 | Srinivasan et al. |
| 6,338,056 B1 | 1/2002 | Dessioch et al. |
| 6,370,522 B1 * | 4/2002 | Agarwal et al. ................. 1/1 |
| 2006/0167850 A1 * | 7/2006 | Fish et al. ........................ 707/3 |
| 2008/0059440 A1 * | 3/2008 | Barsness et al. ................ 707/4 |

OTHER PUBLICATIONS

U.S. Appl. No. 12/027,918, filed Feb. 7, 2008, Notice of Allowance, Dec. 9, 2010.
Benoit Dageville et al., "Automatic SQL Tuning in Oracle 10g", Proceeding of the 30th VLDB Conference, Toronto, Canada, 2004, pp. 1098-1109.

* cited by examiner

*Primary Examiner* — John Breene
*Assistant Examiner* — Dennis Myint
(74) *Attorney, Agent, or Firm* — Hickman Palermo Truong & Becker LLP

(57) ABSTRACT

In one embodiment, a database server registers one or more functions included in a user-defined index that includes one or more auxiliary properties. The one or more functions are operable to generate index entries of the user-defined index for the one or more auxiliary properties. The one or more auxiliary properties are different than, and in addition to, a primary property of the user-defined index that provides for evaluating a query operator. The database server receives a first statement that defines the user-defined index, where the first statement includes one or more parameters that define the one or more auxiliary properties. The database server invokes the one or more functions in response to the first statement, where the one or more functions when invoked generate and store the index entries of the user-defined index according to the one or more parameters that define the one or more auxiliary properties.

28 Claims, 3 Drawing Sheets

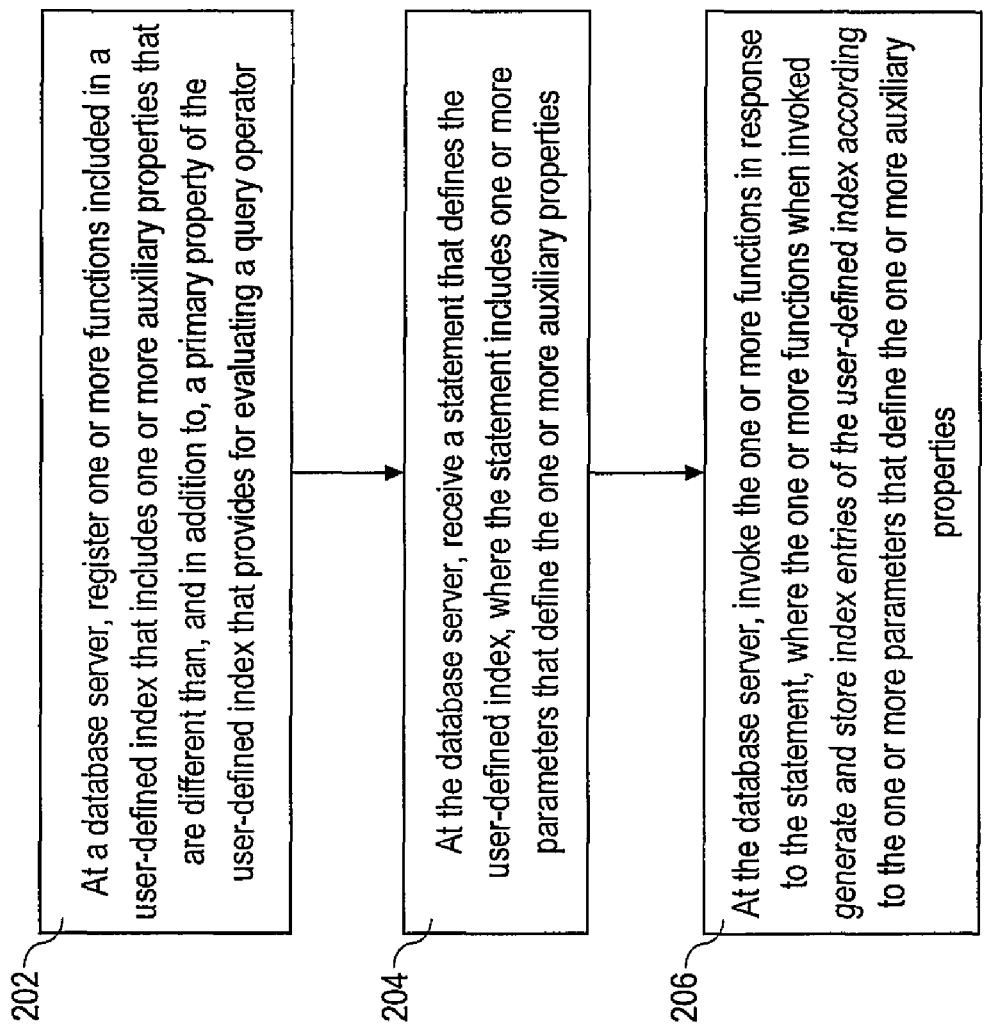

Fig. 2

202 — At a database server, register one or more functions included in a user-defined index that includes one or more auxiliary properties that are different than, and in addition to, a primary property of the user-defined index that provides for evaluating a query operator 204 — At the database server, receive a statement that defines the user-defined index, where the statement includes one or more parameters that define the one or more auxiliary properties 206 — At the database server, invoke the one or more functions in response to the statement, where the one or more functions when invoked generate and store index entries of the user-defined index according to the one or more parameters that define the one or more auxiliary properties

TECHNIQUES FOR EXTENDING USER-DEFINED INDEXES WITH AUXILIARY PROPERTIES

PRIORITY CLAIM; CROSS-REFERENCE TO RELATED APPLICATIONS

This application claims benefit of U.S. Provisional Application Ser. No. 60/952,455, filed on Jul. 27, 2007 by Dinesh Das et al. and entitled "METHOD AND MECHANISM FOR OPTIMIZING SQL STATEMENTS USING USER DEFINED INDEXES WITH AUXILIARY PROPERTIES", the entire contents of which is hereby incorporated by reference as if fully set forth herein, under 35 U.S.C. §119(e).

This application is related to U.S. application Ser. No. 12/027,918, filed on Feb. 7, 2008 by Dinesh Das et al. and entitled "Techniques For Optimizing SQL Statements Using User-Defined Indexes With Auxiliary Properties", the entire contents of which is hereby incorporated by reference as if fully set forth herein.

FIELD OF THE INVENTION

The present invention generally relates to query processing. The invention relates more specifically to techniques for extending user-defined indexes with auxiliary properties.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When used to process a query, a conventional user-defined index can only evaluate a query predicate that includes a user-defined operator supported by the index. After evaluating the user-defined operator, the user-defined index returns a set of row identifiers to a database server. The database server then combines the data rows identified by the row identifiers received from the user-defined index with data rows from other row sources in order to apply any additional filtering and/or ordering that may be specified by the various predicates and clauses of the query being processed. This two-stage data processing for queries that include a user-defined operator is inefficient and adversely affects the performance of the database server at least because the database server needs to use more processing resources such as memory and CPU cycles.

In addition, when a user-defined operator is used in a query in conjunction with additional predicates, the query performance is poor when the additional predicates are selective. This is because the user-defined index, which is used to evaluate the user-defined operator, does not have any information about the additional predicates in the query. As a result, the user-defined index often ends up returning (or identifying) a lot of extra rows to the database server that processes the query, and the database server needs to apply the additional query predicates on all of these extra rows, thus wasting potentially a lot of CPU and I/O cycles.

Moreover, query performance is also poor when user-defined indexes are used to process queries that request ordered result sets. Since a user-defined index is not aware of any ORDER BY clause on the columns of the table in the query, the user-defined index would return an unsorted set of row identifiers when evaluating a user-defined operator specified in the query. A database server processing the query would then need to perform additional processing in order to sort any result set of data rows before the set of data rows is returned in response to the query. This additional processing adversely affects the performance of the database server because it requires that the database server use more processing resources such as memory and CPU cycles. This performance problem is further compounded when a query requests only the top N rows from a result set of rows. In this case, the user-defined index would return to the database server an unsorted set of row identifiers that identify all rows that satisfy the user-defined operator specified in the query, and the database server would need to sort the entire set of identified rows before determining the top N rows which the query is requesting. This, however, results in wasting processing resources both during the evaluation of the user-defined operator by the user-defined index and during the sorting performed by the database server.

As an example, consider a table "DOC" that may be created by the following data definition language statement:

| create table DOC (docID | number, |
|---|---|
| author | varchar(30), |
| pub_date | date, |
| document | CLOB) |

Suppose that a user-defined index "DOCIDX" is declared on table "DOC" as follows:

create index DOCIDX on DOC (document) indextype is (context)

where the "DOCIDX" index may be used to evaluate a "CONTAINS" operator.

Suppose that a database server receives for evaluation the following query "Q1":

| Q1. | select | docID, author |
|---|---|---|
| | from | DOC |
| | where | CONTAINS (document, 'Oracle') > 0 and |
| | | pub_date between '01/01/2007' and '12/31/2007' |
| | order by | pub_date |

When evaluating query "Q1", the database server would invoke the functions of the "DOCIDX" index in order to evaluate the "CONTAINS" operator against the "document" column of the "DOC" table. However, since the "DOCIDX" index does not store any information about any of the other columns in the "DOC" table, the "DOCIDX" index cannot be used to evaluate the filtering predicate "pub_date between 'Jan. 1, 2007' and 'Dec. 31, 2007'" and the ORDER BY clause "order by pub_date" of the query. Instead, after evaluating the "CONTAINS" operator, the "DOCIDX" index returns to the database server an unsorted set of row identifiers that identify the rows from the "DOC" table which satisfy the "CONTAINS" operator. Thereafter, the database server would apply the filtering predicate and the ORDER BY clause of the query to the set of rows identified by the row identifiers returned by the "DOCIDX" index. For example, the database server may use the set of row identifiers returned by the "DOCIDX" index to determine which of the identified rows of the "DOC" table satisfy the filtering predicate "pub_date between 'Jan. 1, 2007' and 'Dec. 31, 2007'"; then the database server would sort the resulting set of rows by "pub_date" in accordance with the ORDER BY clause of the query before returning the sorted set of rows in response to query "Q1". Thus, the use of the user-defined index "DOCIDX" to evaluate query "Q1" results in a two-stage data processing, which not only causes the database server to use more processing resources, such as memory, CPU cycles, and I/O cycles, to process what potentially can be a lot of extra rows, but may also prevent the database server from otherwise optimizing the query for faster processing.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates an example method for extending user-defined indexes with auxiliary properties according to one embodiment.

DETAILED DESCRIPTION

Figure 1:
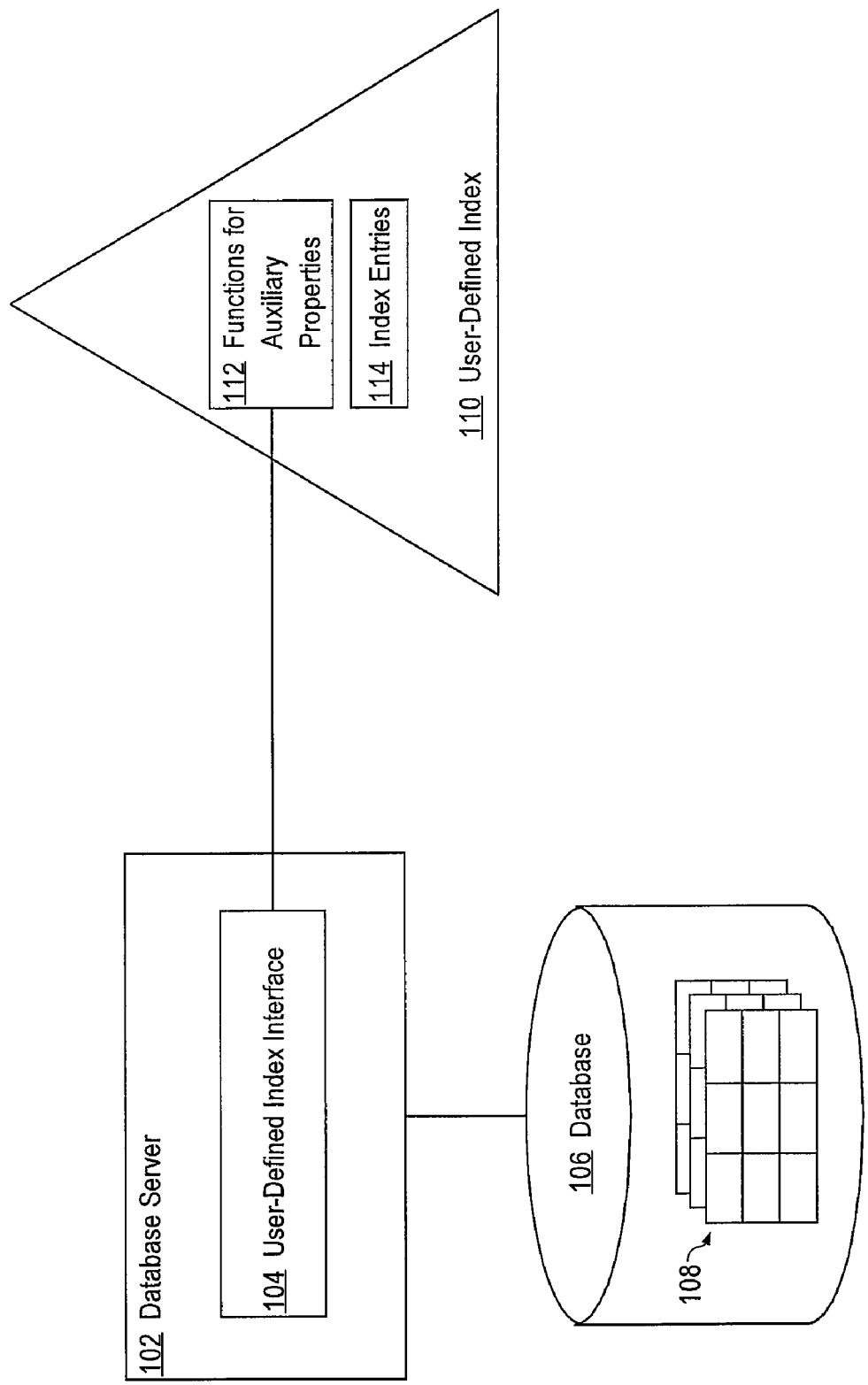
FIG. 1 is a block diagram that illustrates structural details of an example embodiment in which user-defined indexes are extended with auxiliary properties according to the techniques described herein.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

As used herein, "index" refers to a combination of index entries and a set of functions, where the functions when executed are operable to at least create and maintain the index entries and to use the index entries to access and/or process various data. "Function" refers to a set of code that can be invoked or called by an entity such as a database server. "User-defined index" refers to an index with index entries and a set of functions such that the structure of the index entries and the semantics of the set of functions are expressly defined by a user and are not defined in the native executable code of the database server. The set of functions in a user-defined index maintain and use the index entries of the user-defined index outside of the database server (e.g., outside of the memory address space allocated to the database server). When the database server or a component thereof decides to use a user-defined index, the database server invokes the appropriate function of the user-defined index that provides the desired functionality and returns the appropriate results. It is noted that apart from registrations of the functions of a user-defined index, the database server does not store any information about the specific data structures in which the index entries are stored.

Example implementations of a user-defined index are described in Srinivasan et al., U.S. Pat. No. 5,893,104, which issued on Apr. 6, 1999 and is titled "Method And System For Processing Queries In a Database System Using Index Structures That Are Not Native To the Database System".

Auxiliary Properties of User-Defined Indexes

Techniques are described herein for extending user-defined indexes with auxiliary properties.

As used herein, "property" refers to a capability of a user-defined index to provide a particular functionality. A property of a user-defined index is implemented by one or more functions of the index based on the index entries. Typically, a user-defined index has a primary property that provides for evaluating a particular user-defined query operator.

As used herein, "auxiliary property" refers to a capability of a user-defined index to provide a functionality that is different than, and in addition to, the functionality provided by the primary property of the user-defined index. An auxiliary property of a user-defined index is expressly defined by a user and is not implicitly provided by the organization of the index. According to the techniques described herein, the auxiliary property of a user-defined index may be specified by a user through one or more parameters of a data definition language (DDL) statement that creates the index. Further, according to the techniques described herein, a user-defined index may provide one or more functions which, when invoked by a database server with the appropriate arguments, are operable to evaluate one or more query predicates based on the index entries created and maintained for one or more auxiliary properties of the index.

The auxiliary properties of a user-defined index are not implicitly defined or determined by the organization of the index entries. It is also noted that the auxiliary properties described herein are different from implicit properties of regular indexes. For example, a regular B-tree index defined over columns A, B, and C of a given table has the implicit property of ordering the rows of the given table according to the values in columns A, B, C. In another example, a regular B-tree index defined over columns A, B, and C of a given table has the implicit property filtering the rows of the given table based on the values in columns A, B, and C. In contrast, the auxiliary properties of a user-defined index described herein do not depend on the implicit capabilities determined by the organization of the index; rather, the auxiliary properties are explicitly defined by a user.

According to the techniques described herein, a user can define for a user-defined index an ordering auxiliary property for sorting the rows of a given table according to a particular order, which order is explicitly specified by the user and which order may or may not depend on the same table columns over which the index's primary property is defined. Similarly, a user can define for a user-defined index a filtering auxiliary property for filtering the rows of a given table over one or more columns, which one or more columns may or may not be part of the list of columns that are defined for use by the index's primary property. It is noted, however, that the techniques described herein are not limited to extending user-defined indexes only with ordering and filtering auxiliary properties; rather, the techniques described herein may be implemented for any number of different other types of auxiliary properties in various embodiments.

Structural Description of an Example Embodiment

FIG. 1 is a block diagram that illustrates structural details of an example embodiment in which user-defined indexes are extended with auxiliary properties according to the techniques described herein.

In FIG. 1, database server 102 is operable to manage access to one or more databases, such as database 106, which may include one or more tables such as tables 108. Database server 102 is also communicatively coupled to user-defined index 110, which is extendable with one or more auxiliary properties according to the techniques described herein.

As used herein, "server" refers to a set of integrated software components which, when executed, may be allocated computational resources, such as memory, a CPU time, and storage space for providing a particular type of functionality on behalf of clients of the server. "Database server" refers to a server that provides database management functionalities. Among other functionalities of database management, a database server may govern and facilitate access to one or more databases, and may process requests and queries by clients to access and return data stored in the databases. In various embodiments, a database server may be implemented as a single server instance or as a cluster of multiple server instances.

Database server 102 comprises user-defined index interface 104. Interface 104 may be implemented as a set of one or more components which, when executed by the database server, are operable to register and invoke the functions of user-defined indexes such as user-defined index 110. In various embodiments, the set of one or more components that comprise interface 104 may be implemented as software modules executable under (or outside of) the control of the database server, as a library of functions, as one or more dynamically linked libraries (DLLs), or as any other type of software and/or hardware components that are operable to provide interfacing capabilities to the database server.

In some embodiments, database 106 may be a relational database that stores data in various relational data objects including, but not limited to, relational tables, views, and materialized views. In other embodiments, database 106 may be an object-relational database that stores data in various data objects that are instantiated from various object classes. In yet other embodiments, database 106 may be a database that stores extensible markup language (XML) data in various data objects and/or files. The techniques for extending user-defined indexes with auxiliary properties described herein are not limited to being implemented for any particular type of database; rather, the techniques described herein may be implemented for any type of databases that allow use of user-defined indexes to search the data stored in the databases.

According to the techniques described herein, user-defined index 110 is extendable with auxiliary properties. User-defined index 110 comprises a set of functions which include, among other functions, functions 112 that are operable to create and maintain index entries 114 for one or more auxiliary properties and to use index entries 114 to evaluate various query predicates in accordance with the auxiliary properties. For example, functions 112 may include, without limitation, some or all of the following functions: a "create" function that is operable to create the user-defined index; a "drop" function that is operable to delete the user-defined index; an "insert" function that is operable to insert new index entries for one or more auxiliary properties; a "delete" function that is operable to delete index entries for one or more auxiliary properties; an "update" function that is operable to update index entries for one or more auxiliary properties; an "open" function that is operable to access the user-defined index; a "fetch" function that is operable to retrieve index entries for one or more auxiliary properties; and a "close" function that is operable to terminate access to the user-defined index.

In some embodiments functions 112, which are operable to create, maintain, and use the auxiliary properties of user-defined index 110, may be implemented as functions that are different from the functions that implement the primary property of the user-defined index. In other embodiments, functions 112 may be implemented as the same functions that are operable to create, maintain, and use the primary property of user-defined index 110. In these embodiments, a function of the user-defined index may be prototyped with one set of function arguments that reference the primary property of the index and another set of function arguments that reference the one or more auxiliary properties of the index; when the database server invokes this function, the database server would set the appropriate function arguments to indicate which (or what combination of) index properties need to be accessed.

In operation, database server 102 registers through interface 104 functions 112 of user-defined index 110. For example, in some embodiments database server 102 may register functions 112 as part of instantiating user-defined index 110 from an object-oriented class that defines the user-defined index as having a particular index type. In these embodiments, along with the definitions for the user-defined index, the object-oriented class also includes the prototypes of functions 112 that implement the auxiliary properties of the index. Thus, when the database server creates user-defined index 110 as an instance of the object-oriented class, the database server would also create the necessary references and registrations of functions 112.

In other embodiments, database server 102 may register functions 112 in any suitable manner and through any suitable mechanism. For example, interface 104 may store in one or more data structures (e.g., tables, arrays, lists, etc.) metadata information associated with functions 112. Such metadata information may include, without limitation, number and type of input arguments for each function, the type of data or arguments returned by each function, a pointer referencing the starting address in memory of each function, and any other information that may be needed by database server 102 to invoke each function. It is noted that the techniques described herein are not limited to any particular mechanism through which the database server may register the functions that implement the auxiliary properties of the user-defined index. Thus, the examples of mechanisms for registering the auxiliary property functions described herein are to be regarded in an illustrative rather than a restrictive sense.

After database server 102 has registered functions 112, the database server may invoke these functions to create, maintain, and use index entries 114 for the auxiliary properties of user-defined index 110.

For example, database server 102 may receive a DDL statement that defines user-defined index 110, where the DDL statement also includes one or more parameters that define one or more auxiliary properties of the index. In response to the DDL statement, database server 102 determines which functions of user-defined index 110 need to be invoked and then invokes these functions. Since the DDL statement includes parameters for one or more auxiliary properties, database server 102 would invoke (through interface 104) one or more of functions 112 with the appropriate function arguments. Among other things, the function arguments may identify a table over which user-defined index 110 is created, and may pass to the invoked functions that set of data from the table which is necessary for the creation of the index entries for the auxiliary properties of the index. When invoked with the appropriate function arguments, the functions would generate and store index entries 114 in accordance with the auxiliary properties of user-defined index 110.

In another example, database server 102 may receive a database statement that includes a query that comprises one or more parameters. Database server 102 parses the query and, based on the one or more query parameters, determines that some portions (or all) of the query may be evaluated by using the auxiliary properties of user-defined index 110. Database server 102 then invokes one or more of functions 112 with the appropriate function arguments, where the function arguments may include or may be based on the one or more query parameters. When invoked, the functions scan (or otherwise use) index entries 114 to determine a set of row identifiers that identify a set of rows in accordance with the function arguments. (A row identifier is a reference value that uniquely identifies a particular row in a particular table and indicates the location of the row within the storage space allocated to the table.) For example, when the function arguments specify one or more conditions that need to be evaluated according to a particular auxiliary property, the invoked functions would determine the set of row identifiers that identify those rows which satisfy the one or more conditions. In another example, when the function arguments specify a particular order that is defined according to a particular auxiliary property, the invoked functions would sort the set of row identifiers according to the particular order. The invoked functions then return the resulting set of row identifiers to database server 102, and database server 102 uses the set of row identifiers to generate a result set of rows that is returned in response to the query.

In this manner, the techniques described herein extend user-defined indexes by providing auxiliary properties that can be used for processing and evaluating queries in a more efficient manner.

Functional Description of an Example Embodiment

FIG. 2 is a flow diagram that illustrates an example method for extending user-defined indexes with auxiliary properties according to one embodiment.

In step 202, a database server or a component thereof registers one or more functions that are included and implemented in a user-defined index. The user-defined index includes one or more auxiliary properties that are different from, and in addition to, a primary property of the user-defined index that provides for evaluating a particular query operator.

In step 204, the database server or a component thereof receives a DDL statement that defines the user-defined index. The DDL statement includes one or more parameters that define one or more auxiliary properties of the user-defined index.

For example, the DDL statement may be a "CREATE INDEX" statement that is used to create new index entries in a new user-defined index that is defined to include one or more auxiliary properties. In another example, the DDL statement may be a "CREATE PROPERTY" statement that is used to define a new auxiliary property of an already existing user-defined index. In this example, executing the DDL statement at the database server would cause new index entries to be created in the user-defined index in order to support the new auxiliary property. In another example, the DDL statement may be an "ALTER INDEX" statement that is used to modify an existing auxiliary property of an existing user-defined index. In this example, executing the DDL statement at the database server would cause index entries associated with the existing auxiliary property to be modified by, for example, adding, removing, or updating entries. The techniques described herein are not limited to any particular type of DDL statement that can be processed at the database server to affect one or more auxiliary properties of a user-defined index, and for this reason the example DDL statements described herein are to be regarded in an illustrative rather than a restrictive sense.

In step 206, the database server or a component thereof invokes one or more of the registered functions in response to the DDL statement. When invoked, the one or more functions generate and store index entries in the user-defined index according to the one or more parameters in the DDL statement that define the one or more auxiliary properties of the index. Depending on the type of the DDL statement, on the type of the specified auxiliary properties, and/or on the type of the user-defined index, generating and storing the index entries in the user-defined index may involve creating new index entries, deleting some index entries, modifying some index entries, and/or changing the order in which index entries are stored.

Creating and Using User-Defined Indexes With Auxiliary Properties

According to the techniques described herein, a user-defined index may be extended with auxiliary properties by executing a DDL statement at the database server. For illustration purposes, the creation and usage of a user-defined index with auxiliary properties is described in the section with respect to a particular example. It is noted, however, that the techniques described herein are not limited to the particular example described in this section. For this reason, the particular example of creating and using a user-defined index with auxiliary properties described in this section is to be regarded in an illustrative rather than a restrictive sense.

To illustrate the particular example, consider the table "DOC" that may be created in an example embodiment by the following DDL statement

| create table DOC (docID | number, |
|---|---|
| author | varchar(30), |
| pub_date | date, |
| document | CLOB) | where column "document" stores entire documents as values of a CLOB data type, column "pub_date" stores the publication date of the document stored in the same row as a value of a date data type, column "author" stores the name of the author of the document stored in the same row as a value of a varchar data type, and column "docID" stores the document ID of the document stored in the same row as a value of a number data type.

In order to create a user-defined index with extended properties, in this embodiment the following DDL statement may be executed by the database server:

create index DOCIDX on DOC (document) indextype is (context)
 ORDER BY pub_date
 FILTER BY pub_date When the database server executes the above DDL statement, user-defined index "DOCIDX" is created on column "document" of the "DOC" table, and this index is of a "context" index type. Thus, in this embodiment the "DOCIDX" index may be used to evaluate a "CONTAINS" operator against the "document" column of the "DOC" table.

The above DDL statement also specifies that two auxiliary properties are also created in the "DOCIDX" index. The keyword "ORDER BY" indicates that an ordering auxiliary property needs to be created; the parameter "pub_date" associated with the "ORDER BY" keyword indicates that the index entries supporting the ordering auxiliary property are to be created over column "pub_date" of the "DOC" table. The keyword "FILTER BY" indicates that a filtering auxiliary property needs to be created; the parameter "pub_date" associated with the "FILTER BY" keyword indicates that the index entries supporting the filtering auxiliary property are to be created over column "pub_date" of the "DOC" table.

When a database server receives the above DDL statement, the database server determines that a user-defined index of index type "context" over table "DOC" needs to be created with an ordering and a filtering auxiliary properties. Based on the index type and the other parameters specified in the DDL statement, the database server determines which of the registered functions for that index type are operable to create the user-defined index "DOCIDX" with the specified auxiliary properties. Thereafter, the database server invokes these functions with the appropriate function arguments; when invoked, the functions create within the user-defined index a set of index entries that support the primary property of the "DOCIDX" index (for evaluating the "CONTAINS" query operator over the "document" column of the "DOC" table) as well as a set of index entries that support the ordering and filtering auxiliary properties of the index (for sorting over the "pub_date" column and for evaluating various conditions over the "pub_date" column, respectively).

For example, in order to create the "DOCIDX" user-defined index in response to the above DDL statement, the database server may invoke a "create" function with function arguments that may include, without limitation, the following: function argument(s) indicating the name (or other identifier) of the "DOC" table; function argument(s) indicating the name (or other identifier) of the "document" column as the column over which the primary property of the index is to be supported; function argument(s) indicating that an ordering auxiliary property is to be created for the index; function argument(s) indicating the name (or other identifier) of the "pub_date" column as the column over which the ordering auxiliary property is to be supported; function argument(s) indicating that a filtering auxiliary property is to be created for the index; function argument(s) indicating the name (or other identifier) of the "pub_date" column as the column over which the filtering auxiliary property is to be supported; and one or more function arguments that pass to the function the data which the function needs in order to create the index entries for the primary and the auxiliary properties of the "DOCIDX" index.

In some embodiments, the function arguments that pass the data needed for creating the index entries may pass the data by reference—that is, the function arguments are references or pointers to the needed data. (The references or pointers may point to the data in volatile memory and/or in persistent storage, such as the storage space of the table over which the user-defined index is created.) In other embodiments, the function arguments that pass the data needed for creating the index entries may pass the data by value—that is, the function arguments store the data that is needed to create the index entries. In addition, depending on the particular implementation of the user-defined index, in some embodiments the data needed for creating the index entries may be a set of data rows from the table over which the index is created. In other embodiments, the data needed for creating the index entries may be a set of row identifiers that identify a set of data rows from the underlying table. It is noted, however, that the techniques described herein are not limited to any particular function or number of functions, to any particular type and/or number of function arguments, or to any particular type of data that may be used to create or maintain a user-defined index with auxiliary properties. Thus, the examples of functions, function arguments, and types of data described herein are to be regarded in an illustrative rather than a restrictive sense.

In the above manner, the database server may invoke one or more functions in order to create over table "DOC" the user-defined index "DOCIDX" with an ordering and filtering auxiliary properties. When invoked, the one or more functions generate and store one or more sets of index entries that support the primary property defined for the "DOCIDX" index as well as the ordering and filtering properties of the index.

As part of creating the "DOCIDX" user-defined index, the database server also stores metadata information which indicates that the index is created with the ordering and filtering auxiliary properties. Based on this metadata information, the query optimizer of the database server would recognize when a filtering predicate and an ORDER BY clause of a database query (that references the "DOC" table) can be evaluated by the user-defined index "DOCIDX".

As an example, suppose that the database server receives the previously-described query "Q1":

| Q1. | select | docID, author |
|---|---|---|
| | from | DOC |
| | where | CONTAINS (document, 'Oracle') > 0 and |
| | | pub_date between '01/01/2007' and '12/31/2007' |
| | order by | pub_date |

According to the techniques described herein, the query optimizer of the database server would recognize that the query predicate "pub_date between 'Jan. 1, 2007' and 'Dec. 31, 2007'" and the ORDER BY clause ("order by pub_date") can be both evaluated by the "DOCIDX" user-defined index on the "DOC" table. Thus, the query optimizer may generate a query execution plan for query "Q1", in which the evaluation of these query predicates is "pushed" into the "DOCIDX" index. (In this context, "pushing" the evaluation of certain query predicates into a user-defined index means that these query predicates are evaluated by the functions of the index instead of by the database server.) Evaluating query "Q1" according to this execution plan would involve the database server or a component thereof invoking a function of the "DOCIDX" index; when invoked the function: evaluates the query predicate that specifies the "CONTAINS" operator; evaluates the condition specified in the query predicate "pub_date between 'Jan. 1, 2007' and 'Dec. 31, 2007'" by filtering out the index entries which correspond to data rows in which the value in the "pub_date" column is not within the values of "Jan, 1, 2007" and "Dec. 31, 2007"; and evaluates the ORDER BY clause ("order by pub_date") of query "Q1" by sorting the index entries according to the values of the "pub_date" column in the corresponding data rows.

After the function of the "DOCIDX" index evaluates the query against the index entries, the function returns to the database server a set of row identifiers. The returned set of row identifiers identifies those rows of table "DOC" which satisfy both the query predicate that specifies the "CONTAINS" operator and the query predicate "pub_date between 'Jan. 1, 2007' and 'Dec. 31, 2007'". In addition, the returned set of row identifiers is sorted according to the "pub_date" as specified in the ORDER BY clause of query "Q1". The database server then generates the result set of rows for query "Q1" by retrieving the rows identified by the returned set of row identifiers in the order specified therein. In this manner, and contrary to prior approaches, the database server does not have to do any additional data processing in order to sort and/or filter data rows after the functions of the user-defined index "DOCIDX" have evaluated the predicates and the ORDER BY clause of query "Q1".

In some embodiments, a database server may use the auxiliary properties of a user-defined index to evaluate a query only if the query also includes a predicate that specifies the user-defined operator that can be evaluated by the primary property of the user-defined index. In other embodiments, the database server may use the auxiliary properties of a user-defined index to evaluate a query regardless of whether the query includes a predicate that specifies the user-defined operator that can be evaluated by the primary property of the user-defined index. For this reason, the techniques described herein are not limited to any particular way or manner of using the auxiliary properties of a user-defined index to evaluate queries.

Filtering Auxiliary Property

The techniques described herein provide for extending a user-defined index with a filtering auxiliary property. The filtering auxiliary property provides for filtering the index entries of the user-defined index based on conditions that are associated with the table column or columns over which the filtering auxiliary property is defined.

In an example embodiment, a filtering auxiliary property may be specified by a user in a "CREATE INDEX" or "ALTER INDEX" DDL statement that uses the keyword "FILTER BY" followed by a list of columns. When such DDL statement is executed by the database server, the database server or a component thereof invokes a function of the user-defined index. When invoked, the function generates and stores in the user-defined index a set of index entries that can be used to evaluate various conditions that are specified against any or all columns in the list of columns. Each index entry that is generated and stored to support the filtering auxiliary property may include a variety of fields including, but not limited to, a field for storing a row identifier that identifies a particular row in the underlying table over which the user-defined index is created, and one or more fields for storing the values from the particular row for the one or more columns in the list of columns specified after the "FILTER BY" keyword.

In some embodiments, a filtering auxiliary property of a user-defined index may be defined over multiple columns from the underlying table. In these embodiments, the filtering auxiliary property may be used to evaluate conditions that involve some or all of the multiple columns. For example, a user-defined index "DOCIDX" may be defined over a table "DOC" as follows:

```
create index DOCIDX on DOC (document) indextype is (context)
                FILTER BY pub_date, docID
``` where the parameters after the "FILTER BY" keyword indicate that the index entries that support this filtering auxiliary property may be used to evaluate conditions that are specified against one or both of the "pub_date" and "docID" columns of the table "DOC". An example of a predicate that includes such a condition is the following query predicate:
 where ('pub_date'<='Dec. 31, 2007' and docID>1000)
In some embodiments, multiple filtering auxiliary properties may be defined for of a user-defined index. In these embodiments, each of the multiple filtering properties may be used to evaluate conditions that are specified in query predicates. For example, a user-defined index "DOCIDX" may be defined over a table "DOC" as follows:

```
create index DOCIDX on DOC (document) indextype is (context)
                FILTER BY pub_date, author
``` where the first parameter after the "FILTER BY" keyword indicates that the index entries that support this filtering auxiliary property may be used to evaluate conditions that are specified against the "pub_date" column of the "DOC" table, and the second parameter after the "FILTER BY" keyword indicates that this filtering auxiliary property may be used to evaluate conditions that are specified against the "author" column of the "DOC" table. An example of a predicate that includes a condition that can be evaluated by the first filtering predicate is the following query predicate:
 where ('pub_date' between 'Jan. 1, 2007' and 'Dec. 31, 2007')
An example of a predicate that includes a condition that can be evaluated by the second filtering predicate is the following query predicate:
 where (author <>'Brown')
In one embodiment, a filtering auxiliary property may be used to evaluate a query predicate in the following manner. A database server receives a query with a particular predicate that specifies a condition associated with a particular column of a particular table. A query optimizer of the database server determines that the particular predicate may be evaluated by the filtering auxiliary property of a user-defined index that is created over the particular table. The query optimizer generates an execution plan that includes a call to a function of the user-defined index to evaluate the particular predicate. When the database server evaluates the received query based on the generated execution plan, the database server or a component thereof invokes the function of the user-defined index with one or more function arguments that specify the particular condition against the particular column over which the filtering auxiliary property is created. When invoked, the function evaluates the particular condition against the index entries that support the filtering auxiliary property, and filters out (or otherwise excludes) from the result set all index entries for which the particular condition is not satisfied. Thereafter, the function returns the result set to the database server, and the database server uses the returned result set to construct the set of data rows which are returned in response to the received query. In this manner, the particular predicate in the received query is evaluated by the user-defined index, and accordingly the database server conserves any processing resources that the database server might have otherwise used to evaluate the particular predicate of the received query.

Ordering Auxiliary Property

The techniques described herein provide for extending a user-defined index with an ordering auxiliary property. The ordering auxiliary property provides for sorting table rows based on index entries of the user-defined index according to an order that is specified with respect to the values stored in the one or more table columns over which the ordering auxiliary property is defined.

In an example embodiment, an ordering auxiliary property may be specified by a user in a "CREATE INDEX" or "ALTER INDEX" DDL statement that uses the keyword "ORDER BY" followed by a list of columns from the underlying table over which the user-defined index is created. When such DDL statement is executed by the database server, the database server or a component thereof invokes a function of the user-defined index. When invoked, the function generates and stores in the user-defined index a set of index entries that can be used to sort the rows of the underlying table according to an order that is specified with respect to the list of columns specified in DDL statement. Each index entry that is generated and stored to support the ordering auxiliary property may include a variety of fields including, but not limited to, a field for storing a row identifier that identifies a particular row in the underlying table, and one or more fields for storing the values from the particular row for the one or more columns in the list of columns specified after the "ORDER BY" keyword in the DDL statement.

In some embodiments, an ordering auxiliary property of a user-defined index may be defined over multiple columns from the underlying table. In these embodiments, the ordering auxiliary property may be used to sort table rows according to an order that is defined by all of the multiple columns. For example, a user-defined index "DOCIDX" may be defined over a table "DOC" as follows:

---
create index DOCIDX on DOC (document) indextype is (context)
ORDER BY pub_date, docID
--- where the parameters after the "ORDER BY" keyword indicate that the index entries that support this ordering auxiliary property may be used to sort the rows of the "DOC" table in an order in which the rows are sorted first according to the values of the "pub_date" column of table "DOC" and then according to the values of the "docID" column of table "DOC". An example of an ORDER BY query clause that can be evaluated by using the above ordering auxiliary property is as follows:
    order by pub_date, docID
Another example is the following ORDER BY query clause:
    order by pub_date In some embodiments, multiple ordering auxiliary properties may be defined for of a user-defined index. In these embodiments, each of the multiple ordering properties may be used to sort table rows according to an order that is defined by that ordering auxiliary property. For example, a user-defined index "DOCIDX" may be defined over a table "DOC" as follows:

---
create index DOCIDX on DOC (document) indextype is (context)
ORDER BY pub_date
ORDER BY author
--- where the parameter after the first "ORDER BY" keyword indicates that the index entries that support this ordering auxiliary property may be used to sort the rows of table "DOC" according to an order that is defined by the values in the "pub_date" column of the table, and the parameter after the second "ORDER BY" keyword indicates that the index entries that support this ordering auxiliary property may be used to sort the rows of table "DOC" according to an order that is defined by the values in the "author" column of the table. An example of an ORDER BY query clause that can be evaluated by the first ordering auxiliary property is the following clause:
    order by pub_date
An example of an ORDER BY query clause can be evaluated by the second ordering auxiliary property is the following clause:
    order by author In one embodiment, an ordering auxiliary property may be used to evaluate an ORDER BY query clause in the following manner. A database server receives a query with an ORDER BY clause that specifies a particular order defined by one or more particular columns of a particular table. A query optimizer of the database server determines that the ORDER BY clause may be evaluated by the ordering auxiliary property of a user-defined index that is created over the particular table. The query optimizer generates an execution plan that includes a call to a function of the user-defined index to sort the rows of the underlying table according the particular order specified in the ORDER BY clause. When the database server evaluates the received query based on the generated execution plan, the database server or a component thereof invokes the function of the user-defined index with one or more function arguments that specify the particular order, which would be the same as or a derivable from the order supported by the ordering auxiliary property of the user-defined index. When invoked, the function sorts in the particular order based on the index entries any result set that is to be returned to the database server. Thereafter, the function returns the result set to the database server, and the database server uses the returned result set to construct the set of data rows which are returned in response to the received query. In this manner, the ORDER BY clause in the received query is evaluated by the user-defined index, and accordingly the database server conserves any processing resources that the database server might have otherwise used to evaluate the ORDER BY clause of the received query.

Maintaining Index Entries for Auxiliary Properties

In some embodiments, the techniques described herein provide for functions in a user-defined index that a database server can invoke in order to rebuild, modify, and/or otherwise maintain the index entries of the index when the data in the underlying table is changed.

In some embodiments, when any changes are made to the data based on which the auxiliary properties of a user-defined index are created, the changes are propagated through the index entries of the index. For example, when the data over which an auxiliary property is created is modified, the database server or a component thereof invokes a function of the user-defined index and passes the modified data (or references or pointers thereto) as function arguments. When invoked, the function updates or otherwise changes those index entries of the index which are created to support the auxiliary property and which are affected by the modification to the underlying data.

In some embodiments, the modification to the index entries of a user-defined index may be performed as part of the same transaction within which the underlying data is modified. For example, suppose that a particular column of a particular table is being updated during a particular transaction. Before the particular transaction is committed, the database server or a component thereof invokes a function of the user-defined index and passes the modified data (or references or pointers thereto) as function arguments. When invoked, the function rebuilds or otherwise updates those index entries of the index which are created to support the auxiliary property and which are affected by the modification to the particular column. Only after the function returns successfully or otherwise indicates to the database server that the index entries of the user-defined index have been updated, the database server allows the particular transaction to commit. In this manner, the techniques described herein allow a database server to maintain index entries that support auxiliary properties of a user-defined index in an online transaction processing (OLTP) context.

In some embodiments, the techniques described herein provide DDL statements for changing the definitions of the auxiliary properties of a user-defined index. For example, DDL statements may be provided to modify the column lists specified with "FILTER BY" and "ORDER BY" keywords that define the auxiliary properties of a user-defined index. For example, the following DDL statement may add a new filtering auxiliary property to the "DOCIDX" index that is defined over the "DOC" table:

alter index DOCIDX add FILTER BY author where the "add" parameter indicates that a new filtering property is to be added to the "DOCIDX" index and the parameter after the "FILTER BY" keyword indicates that this new filtering property may be used to evaluate conditions that are specified against the "author" column of the "DOC" table. In another example, the following DDL statement drops an existing ordering auxiliary property of the "DOCIDX" index that is defined over the "DOC" table:

alter index DOCIDX on DOC drop ORDER BY pub_date where the "drop" parameter indicates that the index entries that support the ordering auxiliary property over the "pub_date" column need to be dropped.

When a database server receives a DDL statement that modifies the definition of an auxiliary property of a user-defined index, the database server determines which of the index functions are operable to perform the desired modification on the index and invokes those functions. When invoked, these functions rebuild, modify, or otherwise update the index entries that support the auxiliary properties of the user-defined index in accordance with the DDL statement. In this manner, the techniques described herein provide for greater flexibility in the maintenance of the auxiliary properties of a user-defined index.

It is noted that different embodiments may implement different DDL statements for maintaining the index entries that support the auxiliary properties of a user-defined index. For example, various embodiments may define various DDL statements (in various syntax) for adding, dropping, and changing various auxiliary properties that are supported by a user-defined index including, but not limited to, various filtering and ordering auxiliary properties. For this reason, the DDL statements for maintaining auxiliary properties that are described herein are to be regarded in an illustrative rather than a restrictive sense.

Hardware Overview

Figure 3:
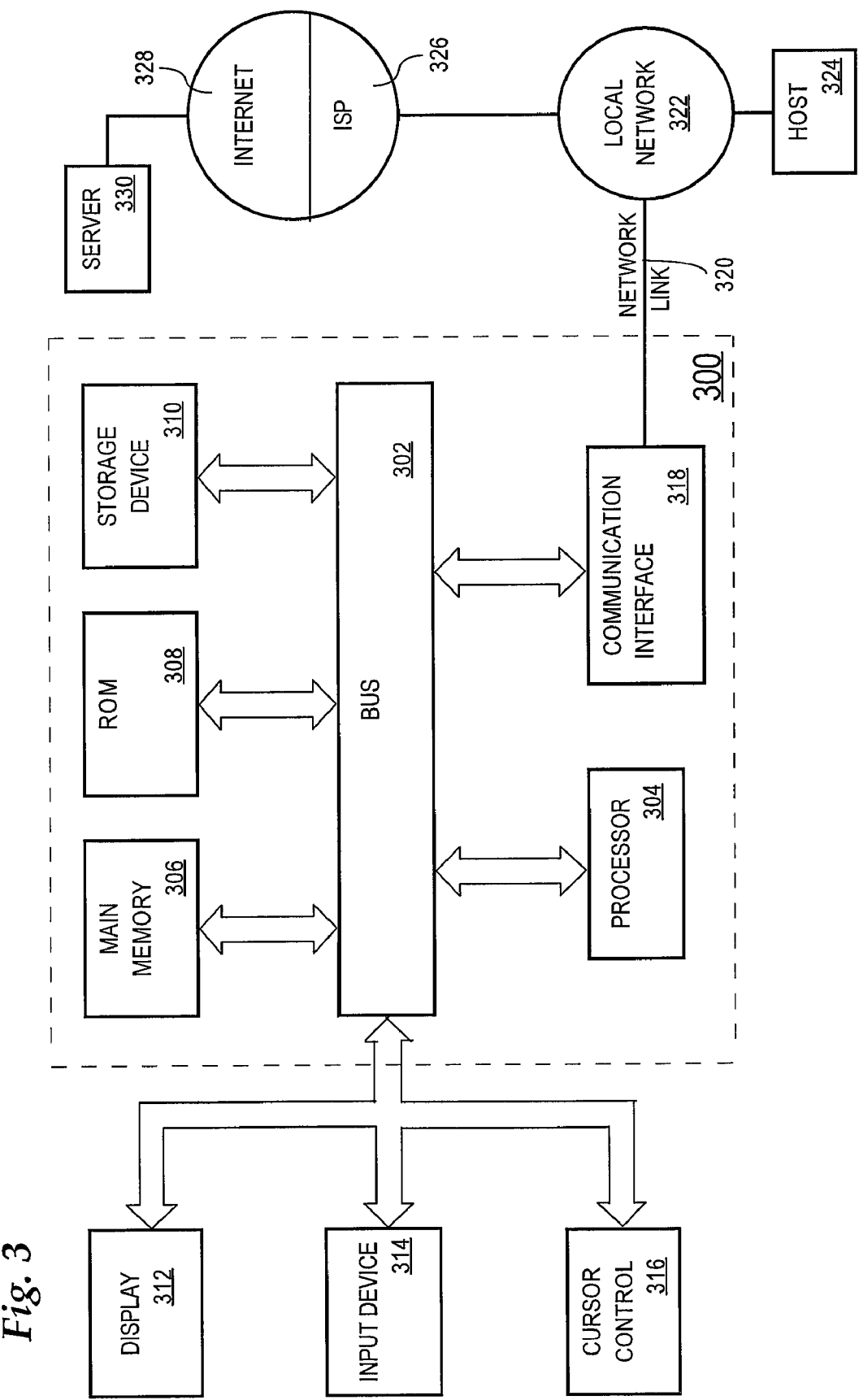
FIG. 3 is a block diagram that illustrates a computer system upon which an embodiment may be implemented.

FIG. 3 is a block diagram that illustrates a computer system 300 upon which an embodiment of the techniques described herein may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, a computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   a database server registering one or more functions included in a user-defined index that includes one or more auxiliary properties, wherein the one or more functions are operable to generate index entries of the user-defined index for the one or more auxiliary properties;
   wherein the one or more auxiliary properties are operational properties of the user-defined index that provide for performing evaluation operations based on the index entries of the user-defined index, and wherein the one or more auxiliary properties are different than, and in addition to, a primary property of the user-defined index that provides for evaluating a query operator associated with the user-defined index;
   the database server receiving a first statement that defines the user-defined index, wherein the first statement includes one or more parameters that define the one or more auxiliary properties;
   the database server invoking the one or more functions in response to the first statement, wherein the one or more functions when invoked generate and store the index entries of the user-defined index according to the one or more parameters that define the one or more auxiliary properties;
   wherein each index entry, of the user-defined index, includes a field for storing an identifier of a data row in a table, wherein the table is identified in the first statement; and
   wherein the method is performed by one or more computing devices.

2. The method of claim 1, wherein:
   the one or more parameters include a list of columns for a filtering auxiliary property of the one or more auxiliary properties; and
   the filtering auxiliary property provides for filtering the index entries of the user-defined index based on conditions associated with the list of columns.

3. The method of claim 1, wherein:
   the one or more parameters include a plurality of column lists that are respectively associated with a plurality of filtering auxiliary properties of the one or more auxiliary properties; and
   each filtering auxiliary property, of the plurality of filtering auxiliary properties, provides for filtering the index entries of the user-defined index based on conditions associated with a column list that is associated with said each filtering auxiliary property.

4. The method of claim 1, wherein:
   the one or more parameters include a list of columns for an ordering auxiliary property of the one or more auxiliary properties; and
   the ordering auxiliary property provides for sorting the index entries of the user-defined index based on an order defined by the list of columns.

5. The method of claim 1, wherein:
   the one or more parameters include a plurality of column lists that are respectively associated with a plurality of ordering auxiliary properties of the one or more auxiliary properties; and
   each ordering auxiliary property, of the plurality of ordering auxiliary properties, provides for sorting the index entries of the user-defined index based on an order defined by a column list that is associated with said each ordering auxiliary property.

6. The method of claim 1, wherein:
   the one or more parameters include a parameter that indicates the table over which the user-defined index is created; and
   the database server invoking the one or more functions comprises the database server passing data from the table to the one or more functions, wherein the one or more functions when invoked generate the index entries based on the data.

7. The method of claim 6, further comprising:
   modifying the data in the table within a transaction; and
   within the transaction, the database server invoking a particular function of the one or more functions, wherein the particular function when invoked rebuilds the index entries of the user-defined index based on modified data that is passed to the particular function by the database server.

8. The method of claim 1, further comprising:
the database server receiving a second statement, wherein the second statement includes a particular parameter that defines a modification of a particular auxiliary property of the one or more auxiliary properties; and
in response to the second statement, the database server invoking a particular function of the one or more functions, wherein the particular function when invoked modifies the index entries of the user-defined index according to the particular parameter that defines the modification.

9. The method of claim 1, wherein:
apart from registrations of the one or more functions, the database server does not store any information about any data structures in which the one or more functions store the index entries of the user-defined index; and
the one or more auxiliary properties are expressly defined in the first statement and are not implicitly defined by the organization of the user-defined index.

10. The method of claim 1, wherein the index entries of the user-defined index store one or more of:
data from the table over which the user-defined index is created; and
row identifiers of data rows in the table over which the user-defined index is created.

11. The method of claim 1, wherein:
the user-defined index is an instance of a particular index type, of a plurality of user-defined index types, that are defined at the database server; and
the one or more functions included in the user-defined index are declared in a definition of the particular index type.

12. The method of claim 1, further comprising:
the database server registering a particular function included in the user-defined index, wherein the particular function is operable to implement a particular auxiliary property of the one or more auxiliary properties;
the database server receiving a second statement, wherein the second statement specifies a query that includes a query parameter;
wherein the query parameter matches a particular parameter, of the one or more parameters, that defines the particular auxiliary property;
the database server evaluating the query at least in part based on the particular auxiliary property by invoking the particular function with the query parameter as a function argument, wherein the particular function when invoked generates a data set based on the index entries of the user-defined index; and
the database server receiving the data set from the particular function.

13. The method of claim 12, wherein:
the particular auxiliary property is a filtering auxiliary property;
the query parameter includes a predicate specifying one or more conditions; and
the particular function when invoked generates the data set by filtering the index entries of the user-defined index based on the one or more conditions.

14. The method of claim 12, wherein:
the particular auxiliary property is an ordering auxiliary property;
the query parameter includes a list of columns that defines a particular order; and
the particular function when invoked generates the data set by sorting the index entries of the user-defined index according to the particular order.

15. A non-transitory computer-readable storage medium storing one or more sequences of instructions which, when executed by one or more processors, cause:
a database server registering one or more functions included in a user-defined index that includes one or more auxiliary properties, wherein the one or more functions are operable to generate index entries of the user-defined index for the one or more auxiliary properties;
wherein the one or more auxiliary properties are operational properties of the user-defined index that provide for performing evaluation operations based on the index entries of the user-defined index, and wherein the one or more auxiliary properties are different than, and in addition to, a primary property of the user-defined index that provides for evaluating a query operator associated with the user-defined index;
the database server receiving a first statement that defines the user-defined index, wherein the first statement includes one or more parameters that define the one or more auxiliary properties;
the database server invoking the one or more functions in response to the first statement, wherein the one or more functions when invoked generate and store the index entries of the user-defined index according to the one or more parameters that define the one or more auxiliary properties; and
wherein each index entry, of the user-defined index, includes a field for storing an identifier of a data row in a table, wherein the table is identified in the first statement.

16. The computer-readable storage medium of claim 15, wherein:
the one or more parameters include a list of columns for a filtering auxiliary property of the one or more auxiliary properties; and
the filtering auxiliary property provides for filtering the index entries of the user-defined index based on conditions associated with the list of columns.

17. The computer-readable storage medium of claim 15, wherein:
the one or more parameters include a plurality of column lists that are respectively associated with a plurality of filtering auxiliary properties of the one or more auxiliary properties; and
each filtering auxiliary property, of the plurality of filtering auxiliary properties, provides for filtering the index entries of the user-defined index based on conditions associated with a column list that is associated with said each filtering auxiliary property.

18. The computer-readable storage medium of claim 15, wherein:
the one or more parameters include a list of columns for an ordering auxiliary property of the one or more auxiliary properties; and
the ordering auxiliary property provides for sorting the index entries of the user-defined index based on an order defined by the list of columns.

19. The computer-readable storage medium of claim 15, wherein:

the one or more parameters include a plurality of column lists that are respectively associated with a plurality of ordering auxiliary properties of the one or more auxiliary properties; and each ordering auxiliary property, of the plurality of ordering auxiliary properties, provides for sorting the index entries of the user-defined index based on an order defined by a column list that is associated with said each ordering auxiliary property.

20. The computer-readable storage medium of claim 15, wherein:

the one or more parameters include a parameter that indicates the table over which the user-defined index is created; and the instructions that cause the database server to invoke the one or more functions comprise instructions which, when executed by the one or more processors, cause the database server to pass data from the table to the one or more functions, wherein the one or more functions when invoked generate the index entries based on the data.

21. The computer-readable storage medium of claim 20, wherein the one or more sequences of instructions further comprise instructions which, when executed by the one or more processors, cause:

modifying the data in the table within a transaction; and within the transaction, the database server invoking a particular function of the one or more functions, wherein the particular function when invoked rebuilds the index entries of the user-defined index based on modified data that is passed to the particular function by the database server.

22. The computer-readable storage medium of claim 15, wherein the one or more sequences of instructions further comprise instructions which, when executed by the one or more processors, cause:

the database server receiving a second statement, wherein the second statement includes a particular parameter that defines a modification of a particular auxiliary property of the one or more auxiliary properties; and in response to the second statement, the database server invoking a particular function of the one or more functions, wherein the particular function when invoked modifies the index entries of the user-defined index according to the particular parameter that defines the modification.

23. The computer-readable storage medium of claim 15, wherein:

apart from registrations of the one or more functions, the database server does not store any information about any data structures in which the one or more functions store the index entries of the user-defined index; and the one or more auxiliary properties are expressly defined in the first statement and are not implicitly defined by the organization of the user-defined index.

24. The computer-readable storage medium of claim 15, wherein the index entries of the user-defined index store one or more of:

data from the table over which the user-defined index is created; and row identifiers of data rows in the table over which the user-defined index is created.

25. The computer-readable storage medium of claim 15, wherein:

the user-defined index is an instance of a particular index type, of a plurality of user-defined index types, that are defined at the database server; and the one or more functions included in the user-defined index are declared in a definition of the particular index type.

26. The computer-readable storage medium of claim 15, wherein the one or more sequences of instructions further comprise instructions which, when executed by the one or more processors, cause:

the database server registering a particular function included in the user-defined index, wherein the particular function is operable to implement a particular auxiliary property of the one or more auxiliary properties;

the database server receiving a second statement, wherein the second statement specifies a query that includes a query parameter;

wherein the query parameter matches a particular parameter, of the one or more parameters, that defines the particular auxiliary property;

the database server evaluating the query at least in part based on the particular auxiliary property by invoking the particular function with the query parameter as a function argument, wherein the particular function when invoked generates a data set based on the index entries of the user-defined index; and the database server receiving the data set from the particular function.

27. The computer-readable storage medium of claim 26, wherein:

the particular auxiliary property is a filtering auxiliary property;

the query parameter includes a predicate specifying one or more conditions; and the particular function when invoked generates the data set by filtering the index entries of the user-defined index based on the one or more conditions.

28. The computer-readable storage medium of claim 26, wherein:

the particular auxiliary property is an ordering auxiliary property;

the query parameter includes a list of columns that defines a particular order; and the particular function when invoked generates the data set by sorting the index entries of the user-defined index according to the particular order.

* * * * *

UNITED STATES PATENT AND TRADEMARK OFFICE
CERTIFICATE OF CORRECTION

| | | |
|---|---|---|
| PATENT NO. | : 7,996,387 B2 | Page 1 of 1 |
| APPLICATION NO. | : 12/027897 | |
| DATED | : August 9, 2011 | |
| INVENTOR(S) | : Das et al. | |

It is certified that error appears in the above-identified patent and that said Letters Patent is hereby corrected as shown below:

In column 20, line 35, in Claim 15, delete "storingan" and insert -- storing an --, therefor.

Signed and Sealed this
Fifteenth Day of November, 2011

David J. Kappos
*Director of the United States Patent and Trademark Office*